United States Patent Office 3,088,806
Patented May 7, 1963

3,088,806
CARBON BLACK PROCESS
Merrill E. Jordan and Harvey M. Cole, Walpole, William G. Burbine, Whitman, and David L. Petterson, Wollaston, Mass., assignors to Cabot Corporation, Boston, Mass., a corporation of Delaware
No Drawing. Filed Nov. 28, 1960, Ser. No. 71,883
8 Claims. (Cl. 23—209.8)

This invention relates to the production of carbon black and is concerned specifically with an improved process for forming carbon black by the impingement of a hydrocarbon-rich flame on a relatively cool surface, e.g. the so-called channel process.

Although channel carbon blacks are all produced by the impingement of a multiplicity of hydrocarbon flames on a relatively cool surface, a wide variety of channel black grades have been characterized and produced commercially. The differences in the various grades of channel carbon blacks are due normally to variations in the chemical and physical conditions under which they are produced and/or aftertreated. However, new and improved grades of channel black are still being sought by the industry as well as new and improved methods of controlling the process variables so as to maintain accurate quality control of any given grade.

Recently, as disclosed in the copending application of George F. Friauf and Brian Thorley, Serial No. 755,880, filed August 9, 1958, now U.S. Patent 3,010,794, it was discovered that in general the properties of carbon blacks can be adjusted and/or the effect on carbon black quality of changes in other variables of the process can be compensated for by introducing into the reaction zone in which the carbon black is being formed, minor amounts of alkali metals having an atomic number of at least 19 or compounds thereof. These alkali metals are, of course, ...ound in group Ia of the periodic system of the chemical elements and consist of potassium (atomic No. 19), rubidium (atomic No. 37), cesium (atomic No. 55), and francium (atomic No. 87). In particular, the use of alkali metal additives in the channel process (a) significantly improves the yield-scale relationship in the production of the black, i.e. a darker colored carbon black can be produced at a given yield, and (b) substantially lowers the oil absorption of the product black.

The exact amount of said alkali metal additives used depends, of course, upon which of these metals are used as well as the exact properties of the product carbon black on which control is most critical and the degree of adjustment desired in said properties. Although measurable effects can often be detected at lower concentrations, it has been discovered that in the channel process, significant effects are achieved in usual practice, only by introducing into the carbon forming reaction zone at least 1000 parts and preferably at least about 3000 parts of said alkali metals per million parts by weight of carbon black being formed in said zone. The best balance of carbon black properties, and the most useful results therefore, are usually achieved when the additives are introduced in amounts sufficient to supply between about 3000 and about 100,000 parts by weight of said alkali metals per 1,000,000 parts of carbon black produced. In some cases, however, the maximum effects on certain properties will not be reached until still higher concentrations of such additives are introduced and, in any case, advantageous results can still be generally obtained by using said additives in greater amounts although maximum effect is usually reached at addition rates below 200,000 parts of the alkali metal per million parts of carbon black produced. Therefore, the maximum rate at which such additives can be used with advantage in the channel carbon black forming reaction is usually dependent upon the amount of extraneous material that can be tolerated in the finished carbon black product. However, in the channel process, only a small proportion of the total additive used usually shows up in the carbon black product actually collected. In any case, the amounts of said alkali metals as specified above may consist entirely of a single one or of any two or more of these elements.

The alkali metal additives are usually introduced as alkali metal compounds or crude materials, solutions, etc. containing same, because handling of the free alkali metals themselves is considerably more complicated and their introduction into a channel plant involves certain hazards. Preferably, the additive material is blended into the hydrocarbon feed materials since the maintenance of a uniform rate of addition and level of concentration is greatly facilitated thereby. However, heretofore the addition of such large quantities of material, i.e. sufficient to supply above about 3000 parts or more of alkali metal per million parts by weight of carbon black collected directly to the hydrocarbon feed materials (usually natural gas whether or not enriched by a hydrocarbon oil) resulted in "flame forking" in a relatively short time and, ultimately, blocking of the burner tips. Flame forking may be described as the change in the pattern of the flame emanating from the burner tip which occurs when material deposits at the burner tip and forms an obstruction therein which deflects the gases emanating from said tip, and thereby causes the flame to separate into two or more "forks." The present invention offers a solution to this "flame forking" and "tip blocking" problem.

Accordingly, it is the principal object of the present invention to provide an improved process for utilizing alkali metal additives in the production of channel carbon black.

Another object of this invention is to provide a process for preventing "flame forking" and/or blocking of burner tips when alkali metal additives are used in the production of channel carbon black.

Other objects of the present invention will in part be obvious and will in part appear hereinafter.

In accordance with the present invention, it was discovered surprisingly that when, in the channel process, certain low melting alkali metal additives, i.e. alkali metal compounds or mixtures thereof that have a melting point of less than about 300° C. such as cesium acetate, cesium hydroxide, rubidium hydroxide, rubidium trisulfide, rubidium acetate, potassium thiocyanate and potassium nitrate are introduced into the carbon black forming zone by means of the hydrocarbon feed materials, "flame forking" does not generally occur, even after prolonged periods of operation. It was further discovered that ideally said additives should be stable at temperatures generally encountered in the lines prior to the burner tip, i.e. at temperatures up to about 425° C.

Although the phenomenon involved is not completely understood, it is believed, and there is no intention to be bound by this explanation, that when alkali metal additives are introduced in effective amounts into the hydrocarbon feed stream of a channel black plant, they tend to deposit at the burner tips and thereby cause "flame forking." The special additives of the present invention, however, are carried through the burner tip without depositing thereat apparently because they exist as stable liquids or vapors at this stage of the process. Accordingly, the additives of the present invention dramatically reduce or entirely eliminate the problem of tip forking. The stability of the alkali metal compounds is important however, because should the alkali metal compounds be subject to decomposition prior to emerging from the tip into the flame, decomposition products might be formed which do not melt at sufficiently low temperatures and may therefore, deposit in the lines or at the burner tip.

In accordance with the present invention, the alkali metal additives can be introduced into the hydrocarbon feed materials in any suitable highly diluted or extended form such as in vapor form in a hot carrier gas, or atomized from a dilute liquid solution or emulsion.

There follow a number of non-limiting illustrative examples. The apparatus utilized in all the examples is substantially identical except as otherwise indicated. 9 cu. ft./hr. natural gas is fed directly to a 3 tip channel house, each tip of which has a slot width of about 18-20 mils. A channel member is suspended over said tips and means are provided for removing deposited carbon black from the channel member and collecting the removed black. The yield in all the runs wherein additives were utilized except as otherwise indicated was approximately the same, i.e. about 1.2 lbs. carbon black per thousand cubic feet of gas.

*Example 1*

Natural gas is fed to the apparatus described above. Normal operation is maintained for about 1200 minutes, during which time no flame forking is observed. The carbon black produced has a nigrometer scale value of about 82.5 and an oil absorption value measured as pounds of oil absorbed per 100 pounds of carbon black, of about 127.

*Example 2*

This example is a duplicate of Example 1 except that there is atomized into the natural gas about 98,780 parts by weight per million parts of carbon black obtained of potassium chloride (melting point about 790° C.) in the form of a 20% aqueous solution of potassium chloride. Normal operation is maintained for about 12 minutes after which time "flame forking" is observed in the burner tips. The product black has an oil absorption value of about 105 and a nigrometer scale value of about 75. (A lower scale value on the nigrometer indicates a greater degree of light absorptivity and, therefore, greater jet blackness of appearance.)

*Example 3*

This example is a duplicate of Example 2 except that instead of the potassium chloride, 372,210 parts by weight per million parts of carbon black obtained of potassium sodium tartrate (melting point between about 70–80° C.) in the form of a 20% aqueous solution is atomized into the natural gas. After 1200 minutes of normal operation no "flame forking" or other indications of blocking of the burner tips are observed. The product carbon black is found to have a nigrometer scale value of about 75 and an oil absorption value of about 105.

*Example 4*

This example is a duplicate of Example 2 except that instead of the potassium chloride, 127,770 parts by weight per million parts of carbon black obtained of potassium thiocyanate (melting point about 172° C.) in the form of a 20% aqueous solution is atomized into the natural gas stream. After about 750 minutes of continuous normal operation no "flame forking" or other indications of blocking of the burner tips are observed. The carbon black product is found to have a nigrometer scale value of about 75 and an oil absorption value of about 104.

*Example 5*

This example is a duplicate of Example 1 except that there is atomized into the natural gas stream about 15,000 parts by weight per million parts of carbon black obtained of cesium sulfate (melting point about 1010° C.) in the form of a 20% aqueous solution. After 80 minutes of normal operation "flame forking" is observed in the burner tips. The carbon black produced has a nigrometer scale value of about 79.5 and an oil absorption value of about 115.

*Example 6*

This example is a duplicate of Example 5 except that instead of cesium sulfate, about 12,410 parts by weight per million parts by weight of carbon black obtained of cesium hydroxide (melting point of 272° C.) in the form of a 20% aqueous solution, is atomized into the natural gas stream. After 1000 minutes of normal operation, no "flame forking" is observed in the burner tips. The carbon black produced has a nigrometer scale value of about 79.5 and an oil absorption value of about 115.

*Example 7*

This example is a duplicate of Example 2 except that there is atomized into the natural gas stream about 10,000 parts by weight per million parts of carbon black obtained of rubidium carbonate (melting point about 837° C.) in the form of a 20% aqueous solution. Normal operation is maintained for about 130 minutes after which time "flame forking" is observed in the burner tips. The carbon black has a nigrometer scale value of about 80 and an oil absorption value of about 117.

*Example 8*

This example is a duplicate of Example 7 except that instead of rubidium carbonate about 11,595 parts by weight per million pounds of carbon black obtained of rubidium trisulfide (melting point about 213° C.) in the form of a 20% by weight aqueous dispersion is atomized into the natural gas stream instead of the rubidium carbonate. After 1000 minutes of normal operation, no "flame forking" is observed in the burner tips. The carbon black has a nigrometer scale value of about 80 and an oil absorption of about 117.

*Example 9*

This example is a duplicate of Example 1 except that there is atomized into the natural gas stream about 20 grams per hour of #2 fuel oil and about 100,000 parts by weight per million parts of carbon black of potassium chromate (melting point 968° C.) in the form of a 20% dispersion potassium chromate in xylene. Normal operation is maintained for about 7 minutes after which time flame forking is first observed in several of the burner tips. The yield of carbon black is found to be about 2.4 lbs. per thousand cubic feet of natural gas. The carbon black has a nigrometer scale value of about 77 and an oil absorption value of about 107.

*Example 10*

This example is a duplicate of Example 9 except that instead of the potassium chromate about 101,450 parts by weight of potassium acetate which has a melting point of about 292° C. in the form of a 20% dispersion of potassium acetate in xylene. After about 100 minutes of continuous normal operation, no "flame forking" or other indications of blocking of the burner tips are observed. The yield is found to be about 2.6 lbs. of carbon black per thousand cubic feet of natural gas. The black has a nigrometer scale value of about 78 and an oil absorption value of about 106.

It will be noted from the above examples that in every case where a high melting additive is utilized "flame forking" and blocking of the burner tips results in a relatively short period of time. Contrastingly when the additives of the present invention i.e. those having a melting point of less than about 300° C., are utilized, normal operation can be accomplished for relatively great periods of time.

Obviously many changes may be made in the above examples and description without departing from the scope of the invention. For example, in addition to those alkali metal compounds specifically mentioned above, other stable compounds of the same alkali metals having a melting point of less than about 300° C., such as potassium trisulfite and cesium formate, are also suitable for the purposes of the present invention.

Accordingly, it is intended that the above examples and description be viewed as merely illustrative and as in no way limiting the scope of the invention.

What we claim is:

1. In the process of producing carbon black in the presence of alkali metal additives in an impingement type process wherein a plurality of small hydrocarbon flames emanating from narrow burner tips impinge on a relatively cool surface, the improvement which prevents flame forking at said tips comprising introducing into the hydrocarbon feed material going to the flame, a substance which is stable at temperatures up to at least about 425° C., said substance also having a melting point of less than about 300° C. and containing a compound of an alkali metal having an atomic number of at least 19 at a rate sufficient to provide at least about 1000 parts by weight of said alkali metal per million parts of carbon black formed.

2. The process of claim 1 wherein said substance comprises a compound of an alkali metal chosen from the group consisting of potassium, cesium and rubidium.

3. The process of claim 1 wherein said substance comprises a potassium compound.

4. The process of claim 1 wherein said substance having a melting point of less than about 300° C. is potassium thiocyanate.

5. The process of claim 1 wherein said substance having a melting point of less than about 300° C. is potassium acetate.

6. In the process of producing carbon black in the presence of alkali metal additives in an impingement type process wherein a plurality of small hydrocarbon flames emanating from narrow burner tips impinge on a relatively cool surface, the improvement which prevents flame forking at said tips comprising atomizing into the hydrocarbon feed material going to the flame, a solution of a compound of an alkali metal having an atomic number of at least 19, said compound being stable at temperatures up to at least about 425° C. and having a melting point of less than about 300° C., said solution being atomized into the hydrocarbon feed material at a rate sufficient to provide at least about 1000 parts of the alkali metal per million parts of carbon black formed.

7. In the process of producing carbon black in the presence of alkali metal additives in an impingement type process wherein a plurality of small hydrocarbon flames emanating from narrow burner tips impinge on a relatively cool surface, the improvement which prevents flame forking at said tips comprising introducing into the hydrocarbon feed material going to the flames a substance which is stable at temperatures up to at least about 425° C., said substance also having a melting point of less than about 300° C. and containing a compound of an alkali metal having an atomic number of at least 19, said substance being introduced at a rate sufficient to provide between about 1000 parts and about 100,000 parts by weight of said alkali metal per million parts of carbon black formed.

8. In the process of producing carbon black in the presence of alkali metal additives in an impingement type process wherein a plurality of small hydrocarbon flames emanating from narrow burner tips impinge on a relatively cool surface, the improvement which prevents flame forking at said tips comprising introducing into the hydrocarbon feed material going to the flames a substance which (a) has a melting point of less than about 300° C., (b) is stable at temperatures up to at least about 425° C., and (c) contains a compound of an alkali metal having an atomic number of at least 19, said substance being introduced at a rate sufficient to provide between about 3000 parts and 100,000 parts by weight of said alkali metal per million parts of carbon black formed.

References Cited in the file of this patent

UNITED STATES PATENTS

| | | |
|---|---|---|
| 2,356,471 | Rehner | Aug. 22, 1944 |
| 2,981,604 | Rogers et al. | Apr. 25, 1961 |
| 3,010,794 | Friauf et al. | Nov. 28, 1961 |